Nov. 3, 1942.         J. CHURCHWARD         2,301,107
                      ELECTRODE HOLDER
                    Filed Nov. 7, 1940
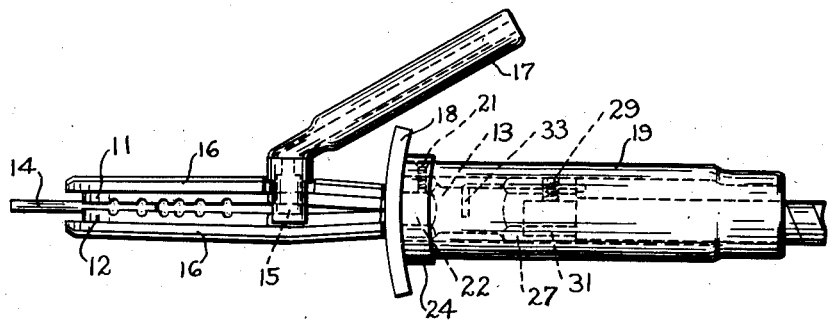
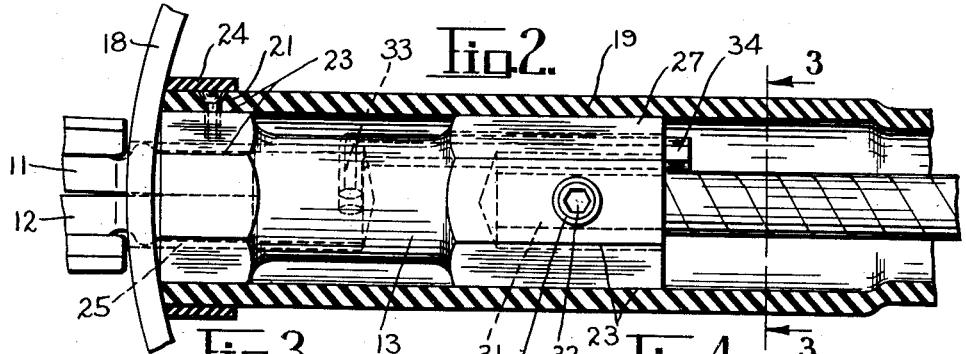
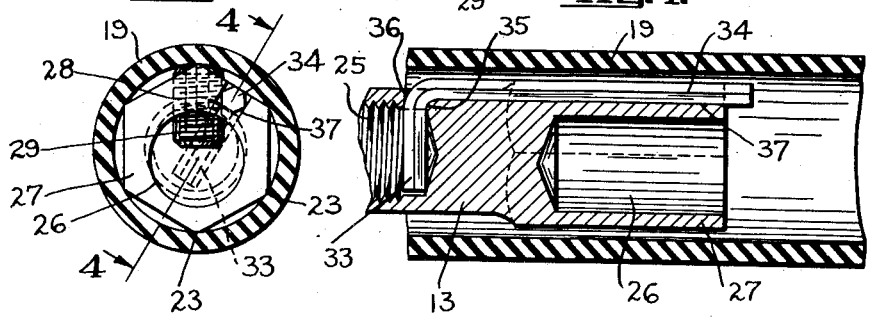
INVENTOR
*Jack Churchward*
BY
*Walter S. Edwards*
ATTORNEY Patented Nov. 3, 1942

2,301,107

UNITED STATES PATENT OFFICE 2,301,107

ELECTRODE HOLDER

Jack Churchward, New Haven, Conn., assignor to The Churchward Engineering Company, Inc., New Haven, Conn., a corporation of Connecticut Application November 7, 1940, Serial No. 364,626

10 Claims. (Cl. 173—269)

This invention relates to electrode holders for use with electric arc welding, or like, apparatus, and more particularly to a new and improved combination of elements thereof.

The features and principles of this invention are particularly applicable for use with the type and form of electrode holder shown in my prior Patents 1,973,701, Reissue No. 20,808, and in a copending application Serial No. 240,934, filed November 17, 1938, and granted as Patent No. 2,232,213, but are not limited to such use as they may be advantageously applied to other forms of electrical devices. In electrode holders provision is usually made to clamp an electric power cable to a connector block, or like element, by means of a headless, or socket, set screw which requires a wrench, or like tool, to actuate it. In instances where the welding equipment is used in the field, or remote from convenient access to tools, it is important that the tool required for actuating the clamp screw be conveniently disposed for immediate use should the need for its use arise to change cables, etc. Such tools, in most instances, are comparatively small and if carried in the operator's pocket are often lost, or misplaced, causing much inconvenience and loss of time to replace them. It is, therefore, contemplated, as one object of this invention, to provide in combination with an electrode holder of the above nature, a tool for actuating the cable, or like, clamp screw thereof.

Another object is to provide in an electrode holder of the above nature means to receive and retain a tool for actuating an element in the structure of the holder, or like device.

Still another object is to provide, in such a type of electrode holder, common means to insulate elements thereof and to cover and retain an operating tool for an element thereof.

A further object is to provide an improved electrode holder of the above, or analogous, nature which will be relatively simple in construction, inexpensive to manufacture, readily manipulated, compact, and very efficient and durable in use.

With these and other objects in view, which will appear as the description of the invention proceeds, there has been illustrated in the accompanying drawing a form in which the features and principles of this invention may be conveniently embodied in practice.

In the drawing:

Figure 1 is a side view of one form of electrode holder embodying the novel features and principles of this invention;

Figure 2 is an enlarged broken longitudinal section of the handle end of the holder shown in Figure 1;

Figure 3 is a sectional view taken on the line 3—3 of Figure 2; and

Figure 4 is a broken sectional taken on the line 4—4 of Figure 3.

Referring now to the drawing, wherein like reference numerals designate like parts throughout the several views, the numerals 11 and 12 denote a pair of metallic jaws screw-threaded at one end jointly into a cable connecting block 13 and adapted at their other end to clamp a welding electrode 14 therebetween. An operating trigger member 15 is provided to open the jaws 11 and 12 to release the electrode therefrom. In this instance the jaws 11 and 12 and the trigger member 15 are protected by insulating strips 16 and an insulating tube 17 respectively. An insulating shield 18 is provided between the jaws 11 and 12 and the connecting block 13 and a tube 19 of insulating material is provided to cover the cable connecting block 13. The tube 19 is secured to the block 13 by a slotted flat-headed screw 21, which passes through the tube 19 and is screw-threaded into the end 22 of the block 13 adjacent the shield 18. A detailed description of an electrode holder of the above construction may be found by the above referred to patents and patent application.

The cable block 13, in this instance, is formed from a length of hexagonal stock, preferably of brass, and the tube 19 is of proper internal diameter to snugly fit over the apices 23 of this form of block when it is slid thereover. The screw 21 is screw-threaded into the block 13 at one of its apices 23. In this instance a band of insulating material 24 is disposed over the head of the screw 21. The front end 22 of the block 13 is provided with a screw-threaded opening 25 into which the jaws 11 and 12 are screwed, and this opening 25 is preferably concentric with the axis of the block 13.

The block 13 is provided with a cable receiving opening 26 in its rear end 27 and this opening 26 is preferably formed eccentric to the block 13 and below one of the apices 23. A screw-threaded hole 28 is provided to threadingly receive a cable clamp screw 29. The hole 28 extends downwardly through the block end 27 from one of the apices 23 into the opening 26 and, due to the eccentric disposition of the opening 26, sufficient thickness of metal is provided to insure the desired number of screw threads to be formed in the hole 28 whereby secure clamping of a cable end 31, disposed in the opening 26 is assured. The screw 29, in this instance, is one of the well-known forms of headless set screws having an actuating tool receiving socket 32 therein. The socket 32 shown is hexagonal in cross-section but other forms are known and in use and these, or the common slotted end set screws, may be used in place of the particular form shown, if desired.

In all instances where a cable clamping set screw is provided in an electrode holder of the above nature, a tool, or wrench, is required to actuate the same and such a tool must have a screw engaging end to fit into the socket or slot, provided in the outer end of the clamp screw. As referred to above, such a tool, or wrench, may be required to release the cable end 31 from the block 13 to replace it with the end of another cable when the welding equipment is located at a point from which it is inconvenient to leave to obtain such a tool. As these tools are, in most instances, relatively small they are easily lost, or misplaced, and, therefore, it is not advisable to have an operator carry them loosely in his pocket, or the like. To obviate these disadvantages there is shown herein a novel arrangement whereby such a tool may be conveniently combined with the electrode holder and be, at all times, accessible for use, and not readily lost nor misplaced. In view of this invention, it is also possible for an electrode holder manufacturer to provide, a set screw of a preferred and efficient form, which in most instances, will require a special form of tool to actuate it and which may not be in common use nor conveniently obtainable by his customers, and a tool for actuating such a screw, in combination with the other elements of the electrode holder being furnished.

The socket set screw 29 shown herein requires a wrench having a tool end 33 which is relatively short in length and hexagonal in cross-section. The tool end 33 is provided with an integral shank, or handle portion 34 which, in this instance, extends away from the tool end 33 at a right angle thereto. Provision is made in the body of the cable connecting block 13 whereby a shoulder 35 is formed over which the tool end 33 may be hooked with its handle portion 34 extending axially along the block 13 beneath the tube 19. The shoulder 35 prevents the wrench from sliding axially along the block 13 and the tube 19, overlying the handle portion 34 prevents the tool end 33 moving radially with respect to the block 13 to become disengaged from the shoulder 35.

In the particular form illustrated, the shoulder 35 is formed by providing a radially directed hole 36 in the block 13 which is adapted to receive the tool end 33 and a groove 37 is provided which extends through the hexagonal-shaped rear end 27 of the block 13 and is adapted to receive the tool handle portion 34. The insulating handle tube 19 when slipped in place over the connecting block 13 acts to prevent the tool handle portion moving entirely out of the groove and retains the tool 33 in the hole 36 whereby the tool cannot become separated from the electrode holder and lost or misplaced.

It is proposed to furnish with all electrode holders of the above and analogous forms a tool suitable to actuate a cable, or like, clamping screw as a part of the holder and therefore a wrench 33, 34 is assembled with the other elements of the electrode holder when they are assembled. This is convenient to do, for, after tightening the clamp screw 29 the tool part 33 of the wrench is placed back of the shoulder 35 by its insertion into the hole 36 and its shank or handle portion 34 is set into the groove 37. The tube 19 is then slid into place by means of the screw 21. Any time it is necessary to release the cable end 31 from the holder, the screw 21 is removed, the tube 19 is removed, and the wrench is then accessible to be used to unloosen the clamping screw 29.

While there has been disclosed in this application one form in which the invention may be embodied, it is to be understood that the invention may be embodied in other forms without departing from the spirit or essential attributes thereof, and it is, therefore, desired that the present embodiment be considered in all respects as illustrative, and not restrictive, and it will be further understood that each and every novel feature and combination present in, or possessed by, the device herein disclosed forms a part of the invention included in this application.

Having thus fully described the invention, what is claimed as new and for which it is desired to obtain Letters Patent, is:

1. In an electrode holder, a cable connector having a cable end receiving hole, a tool actuated means for clamping a cable end therein, a removable tool for actuating said means and having a handle portion, means on said connector to retain said tool against axial movement in respect to said connector, and holder handle means overlying said connector and the handle portion of said tool to retain said tool against movement away from said first tool retaining means.

2. In an electrode holder, a cable connector having a cable receiving hole, a tool actuated means for clamping a cable end in said hole, a removable tool for actuating said means and having a means engaging end, a second means on said connector engaged by said tool to retain it against axial movement in respect to said connector, and means removably slipped over and secured to said connector and forming a handle for said electrode holder to maintain said tool in engagement with said second means.

3. In an electrode holder, a cable connecting block having a cable receiving hole, a tool actuated means for clamping a cable end in said hole, a tubular member removably extended over said connecting block to form a handle for said electrode holder, and a separate tool for actuating said means loosely disposed between said connecting block and said tubular member to be held in place by the latter.

4. In an electrode holder, a cable connecting block having a cable receiving hole, a tool actuated means for clamping a cable end in said hole, a separate tool for actuating said means loosely disposed adjacent said connecting block, and a tubular handle for said electrode holder removably slipped over said block and overlying said tool to hold it in place.

5. In an electrode holder, a cable connecting block having a cable receiving hole, a tool actuated means for clamping a cable end in said hole, a tool removable for actuating said means disposed adjacent the periphery of said connecting block, and common means of insulating material removably slipped over said block to hold said tool in place and to form a handle for said electrode holder.

6. An electrode holder having a cable connecting block adapted to receive a cable end, a socket screw for clamping a cable end to said block, a tool to actuate said screw and having a bent end, a shoulder on said block to be engaged by the bent end of said tool to retain it against movement in one direction, and a tubular handle member disposed over and removably secured to said block to overlie and thereby retain said tool against movement out of its shoulder engaged position.

7. An electrode holder having a cable connecting block adapted to receive a cable end, a socket screw for clamping a cable end to said block, a tool to actuate said screw and having a bent end extending from a shank portion, a radially directed hole formed in said block to receive the bent end of said tool, and a removable tubular handle member for said holder slipped over said block and overlying the shank portion of said tool to retain its first end in the hole in said block.

8. An electrode holder having a cable connecting block adapted to receive a cable end, a socket screw for clamping a cable end to said block, a tool to actuate said screw and having a bent end extending from a shank portion, a radially directed hole formed in said block to receive the bent end of said tool, said block having a groove formed therein to receive the shank portion of said tool, and a removable tubular handle member slipped over and releasably secured to said block and overlying said tool to retain its bent end in the said hole and said shank portion in the said groove.

9. The combination in an electrode holder having a cable connecting member, said member having a cable receiving hole extending from one end thereof, the axis of the hole being parallel to the axis of said member but eccentric thereto to provide a thickened wall portion, said member having an axially extending groove in the thickened wall portion, means passing through the thickened wall portion to clamp a cable in the hole in the member, a removable tool for actuating said clamping means and adapted to be received in the groove in said thickened wall portion, and means adapted to be slipped over the connecting member to overlie the tool and retain it in the aforesaid groove.

10. The combination in an electrode holder having a cable connecting member, said member having a cable receiving hole extending from one end thereof, the axis of the hole being parallel to the axis of said member but eccentric thereto to provide a thickened wall portion, said member having an axially extending groove in the thickened wall portion, a rotatable part passing through the thickened wall portion to clamp a cable in the hole in the member, a removable tool having a part engaging portion and a handle portion for actuating said rotatable part, said tool handle portion being adapted to be received in the groove in said thickened wall portion, and means adapted to be slipped over the connecting member to overlie the tool handle portion and retain it in the aforesaid groove.

JACK CHURCHWARD.